United States Patent
Tsirigotis

[11] 3,935,293
[45] Jan. 27, 1976

[54] METHOD FOR THE MANUFACTURE OF METALLIC CHLORIDES

[75] Inventor: Constantin Tsirigotis, Athens, Greece

[73] Assignee: Larco Societe Miniere et Metallurgique de Larymna S.A., Athens, Greece

[22] Filed: June 29, 1973

[21] Appl. No.: 375,093

[30] Foreign Application Priority Data
Mar. 6, 1973 Luxemburg............................ 67161

[52] U.S. Cl. .................... 423/39; 423/40; 423/149; 423/492; 423/493; 23/260
[51] Int. Cl.² ..................... C01G 49/10; C01G 53/08; C01G 37/04; C01G 3/04
[58] Field of Search ............ 423/493, 492, 40, 149, 423/39

[56] References Cited
UNITED STATES PATENTS

| | | | |
|---|---|---|---|
| 1,814,392 | 7/1931 | Low et al. ...................... | 423/492 X |
| 1,911,505 | 5/1933 | Herold et al. ................... | 423/492 X |
| 2,126,455 | 8/1938 | Dettwyler ......................... | 423/493 |
| 2,368,319 | 1/1945 | Muskat ....................... | 423/492 UX |
| 2,843,472 | 7/1958 | Eberhardt ........................ | 423/493 X |
| 3,702,367 | 11/1972 | Vollbrecht ....................... | 423/493 |
| R26,982 | 11/1970 | Long et al...................... | 423/492 X |

FOREIGN PATENTS OR APPLICATIONS

| | | |
|---|---|---|
| 34,129 | 3/1968 | Greece |
| 34,191 | 4/1968 | Greece |
| 34,192 | 4/1968 | Greece |
| 34,193 | 4/1968 | Greece |

*Primary Examiner* — Edward Stern
*Attorney, Agent, or Firm* — Larson, Taylor and Hinds

[57] ABSTRACT

The raw material contains 80% by weight of an alloy of two at least of the metals of the group Fe, Ni, Cr, Cu, Co (and possibly sulphur), in the form of ingots, scrap-metal or mats, in pieces less than 200 mm in size. The alloys are firstly subjected to a chlorination operation at a temperature comprised between 600°C and 1350°C and then to the recovery operation for the chlorides formed. An enclosure, called a chlorination enclosure, is charged with (a) the alloy, (b) a gaseous mixture containing chlorine and HCl, (c) oxygen, and (d) at least one agent for regulating the temperature of the enclosure. The composition of the gaseous mixture, when it is constituted at the same time of $Cl_2$ and of HCl, responds to the following conditions:

5 % < the proportion of $Cl_2$ < 90 %
1 % < the proportion of HCl < 75 %
1 % < the proportion of $O_2$ < 35 % the partial pressures satisfying on their part the following conditions:

$2P_{Cl_2} + P_{HCl} > 0.2$ atmosphere, and
$P_{O_2} < P_{HCl} + P_{Cl_2}$ and the recovery of the gaseous chlorides formed is ensured by lowering the vapor pressure of these chlorides.

13 Claims, 1 Drawing Figure

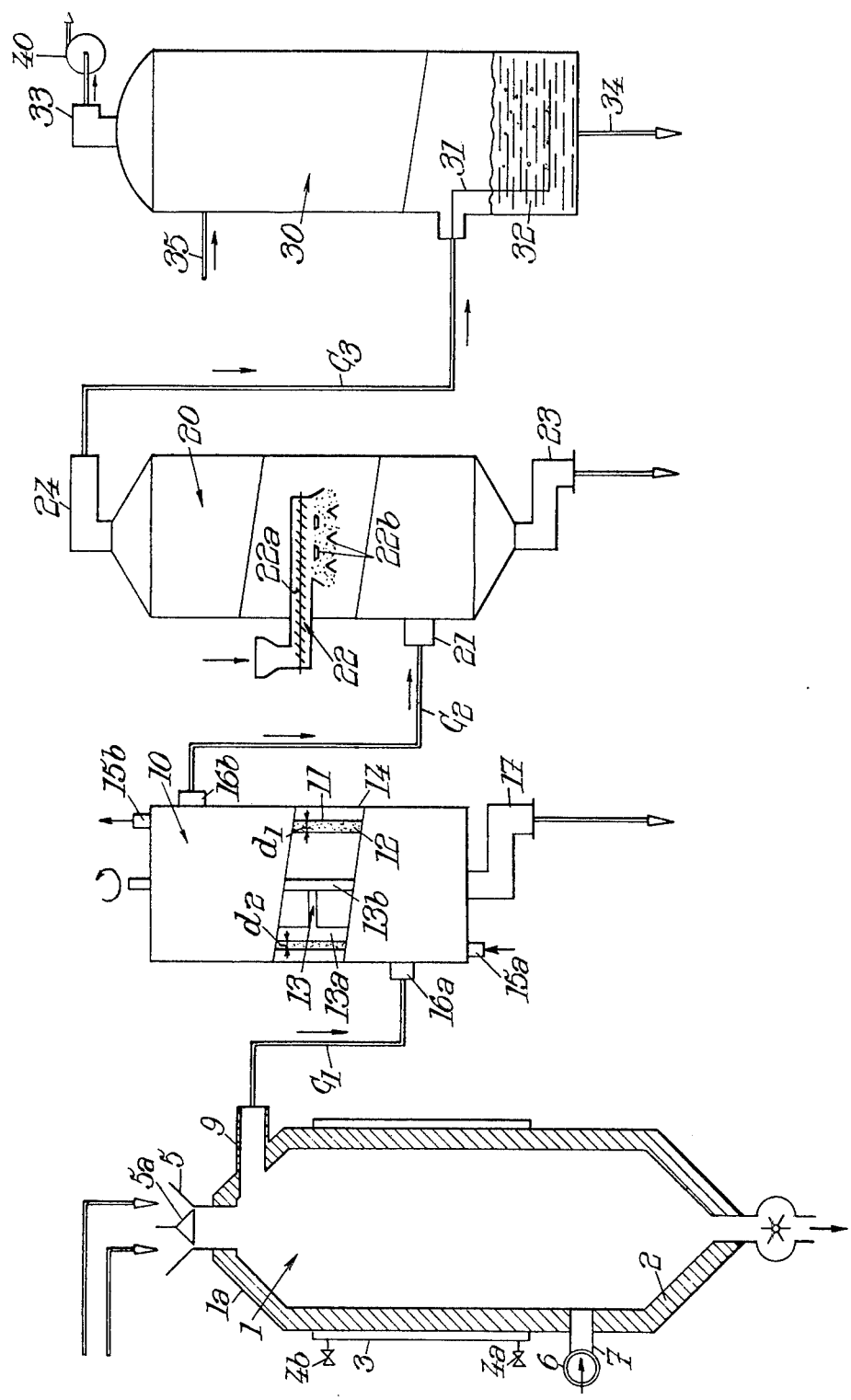

METHOD FOR THE MANUFACTURE OF METALLIC CHLORIDES

The invention relates to means, namely a method and an installation, for the manufacture of metallic chlorides, these means being of the type in which there are used, as raw material, alloys having the form of scrap, turnings, ingots and mats. The metallic chlorides envisaged are those of the group constituted by Fe, Ni, Co, Cr and Cu.

In metallurgical industries, metallic products are frequently encountered in the form of scrap, turnings, ingots and mats based on alloys of at least two of the metals of the group Fe, Ni, Co, Cr and Cu and containing sulphur, at least in the case of mats.

The constituent metals of these products make them materials of value whose treatment, especially with a review to the recovery of the chlorides, is profitable.

It is a particular object of the invention, to provide means of the type concerned responding better than those already existing to the various desiderata of practice and enabling the recovery of the said metals concerned in the form of very pure chlorides, either mixed with one another or separated from one another.

To do this, a raw material, in the form of scrap, turnings, ingots and mats, containing at least two of the abovesaid metals, are treated, these metals and the sulphur possibly present, constituting preferably at least 80 percent by weight of the raw material. The scrap, turnings, ingots and mats are subjected in the form of pieces less than 200 mm in size, firstly to a chlorinating operation at a temperature comprised between about 600°C and about 1350°C, then to a recovery operation for the chlorides formed.

According to the invention, there are introduced into an enclosure, called the chlorinating enclosure, on the one hand a charge constituted, at least in part, of the metallic alloys to be chlorinated, on the other hand, a chlorinating gaseous mixture containing chlorine and HCl, alone or preferably in admixture, as well as oxygen and, on the other hand again, at least one regulating agent for the temperature of the enclosure, the composition of the gaseous mixture when it is constituted at the same time by $Cl_2$ and HCl responding to the following conditions:

5% < the proportion of $Cl_2$ < 90%
1% < the proportion of HCl < 75%
1% < the proportion of $O_2$ < 35% and the partial pressures to the following conditions:

$2 P_{Cl_2} + P_{HCl} > .2$ atmosphere
$P_{O_2} < P_{HCl} + P_{Cl_2}$ the recovery and possible separation from one another, of the gaseous chlorides formed being ensured by lowering the vapor pressure of these chlorides.

Other characteristics of the invention will appear in the course of the description which follows and which relates to preferred embodiments of the invention, illustrated by examples and by the drawing in which the single FIGURE shows, in diagrammatic view, the principal elements of an installation constructed according to the invention.

To avoid possible noxious effects due to the introduction into the chlorinating enclosure of a raw material at a relatively low temperature, it may be advantageous to preheat this raw material before its introduction. This preheating can be such that the temperature of the raw material is brought at least to about 500°C.

The addition of an agent for adjusting the temperature must, on one hand, enable the maintenance of the temperature of the reaction mixture within the abovesaid limits by compensating the exothermic character of the reaction of formation of the chloride and, on the other hand, if necessary, ensuring locally an introduction of calories to avoid for example premature condensation of the chlorides formed.

The abovesaid agent can be gaseous or solid; as far as a gaseous agent is concerned, $CO_2$ or nitrogen can be used, or again a mixture of the two; when the agent selected is carbonic acid gas, it reacts, as known, with the carbon of the charge in strongly endothermic manner by forming carbon monoxide. Among the solid agents for regulating the temperature, there may be mentioned carbon-containing materials, for example coke, the ratio of the volumes of the carbon-containing materials and the metallic alloys being comprised between 1 and 5; in the case where the carbon-containing material is constituted by coke, the abovesaid ratio is comprised, preferably, between 3 and 5; other solid regulating agents may be constituted for example by sand or by residual chlorides. The advantage of using coke resides not only in its quality as a temperature regulating agent, but also in the fact that it reduces the possibility of agglomeration of the materials; it also favors the permeability of the charge and, in this respect, it advantageously is in the form of pieces of dimensions less than 140 mm.

The introduction of the temperature regulating agent into the chlorinating enclosure may be effected, when the agent is gaseous, by mixing it with the gaseous constituents of a chlorinating atmosphere and, when it is solid, by mixing it with the raw materials containing the metallic alloys to be treated.

It may be advantageous to use simultaneously several agents for regulating the temperature in order to increase the flexibility of said regulation due to the possibilities of adjusting the proportions and/or the respective temperatures of the various solid or gaseous materials used as regulating agents.

The gaseous mixture extracted from the chlorinating enclosure and which comprises not only the chlorides formed but also possibly non-reactant gases, residual chlorinating gases, $CO_2$, CO and $SO_2$, as well as possibly dust in suspension, is subjected to a treatment for the recovery of the chlorides by reduction of the vapor pressure of these chlorides, for example by ensuring controlled cooling of the mixture or by absorption of the chlorides in a fluid. If it is desired to separate the chlorides formed from one another, techniques known in themselves may be applied.

The abovesaid lowering in the vapor pressure of the chlorides may be effected, in a first embodiment, by cooling in controlled manner the gaseous mixture inside at least one enclosure which the outer wall is cooled, for example by the flow of a fluid such as air, the one or more chlorides being then deposited on the inner surface of this wall; according to the invention, there is removed by scraping only a part of the chlorides deposited, allowing a layer of condensed chlorides to remain whose thickness is preferably comprised between 2 and 15 mm. This layer of condensed chlorides, on the one hand, contributes to ensuring the constancy of the temperature on the inside of the enclosure and on the other hand ensures the protection of the wall against the corrosive effects of chlorides in the gaseous state whilst playing a role of a heat insulator.

This layer enables in addition an increase in the quality of the condensed product by adjustment of the speed of crystallisation.

In a second embodiment, the abovesaid lowering in vapor pressure is ensured by introducing into the recovery enclosure, at the same time as the gaseous mixture containing the chlorides, an adjusted amount of a cooling agent of which the temperature is less than that of the gaseous mixture and which may be selected in the group comprising carbonic acid gas, nitrogen and certain solid metallic chlorides, for example those of nickel or of iron.

In a third embodiment, the same lowering in the vapor pressure is ensured by the placing in contact of the gaseous mixture containing the chlorides with a fluid, inert with respect to the chlorides and selected for example from the group comprising water, $CCl_4$, and $C_6Cl_6$.

It is advantageous to apply the method according to the invention, by keeping at least the recovery enclosures for the chlorides at a pressure less than atmospheric pressure.

This being the case, the method according to the invention is applied in an installation which comprises on one hand a chlorinating enclosure and on the other hand at least one recovery enclosure for the chlorides formed.

As regards firstly the chlorinating enclosure, it may be constituted, as shown diagrammatically in the FIGURE, by a tank 1 whose walls 1a are lined internally with a refractory coating 2 and, over at least a portion of the outer surface, with a cooling device such as a jacket 3, surrounding the tank and traversed by the fluid of which the flow-rate may be regulated by suitable devices 4a and 4b. Said tank is provided with means for the introduction of solid materials (for example in the form of a charging hopper 5 and of a bell 5a), means for introducing gas (for example in the shape of one or several circular pipes 6 provided with tuyeres 7), means 8 for the possible extraction of solid residues and, lastly, means (not shown in the FIGURE) for the trapping of the gaseous mixture containing among other things and particularly the metallic chlorides formed in said tank 1, as well as means 9 for removing said gaseous mixture to the recovery enclosures for the chlorides.

As regards now the abovesaid recovery enclosures, the invention provides for their establishment in several ways.

In a first embodiment, the recovery enclosure, denoted by 10 as a whole, comprises an envelope 11 cooled externally and at the inner surface of which are deposited the chlorides formed in the shape of a layer 12 of thickness $d_1$, this enclosure being equipped with scrapers 13 arranged so that they allow to remain only a thickness $d_2$ of at least 2 mm.

The cooling of the envelope 11 can be obtained by surrounding the wall 11 by a second wall 14 arranged at a certain distance from the envelope 11 and by providing between the two walls a circulation of cooling fluid entering for example through a pipe system 15a and emerging through a pipe system 15b. The scrapers 13 may comprise a blade 13a borne by a rotating shaft 13b as shown. The introduction of the gaseous phase contained in the chlorides is effected through a passage 16a and the evacuation of the noncondensed gases through a pipe 16b. The recovery of the solid chlorides may be effected by a pipe 17.

In a second embodiment, the recovery chamber, denoted as a whole by 20, comprises on one hand an inlet pipe 21 for the chlorides formed in the gaseous phase, and on the other hand means for introducing at the same time a solid liquid or gaseous cooling agent, of given temperature, and in an amount such that condensation of the one or more chlorides desired is produced.

The means for introducing the cooling agent may be constituted in a manner known in itself, for example when it relates to a powdered solid agent (embodiment shown diagrammatically at 22) by a feedscrew 22a cooperating with distributing means 22b; when it relates to a liquid agent, these means (not shown) may be constituted by a scrubber, and, when it relates to a gaseous agent, by an injection nozzle.

The enclosure comprises also a pipe 23 for the extraction of the solid chlorides and a pipe 24 for the extraction of the uncondensed gases.

In a third embodiment, the recovery chamber for the chlorides comprises means for placing in contact the gaseous phase containing the chlorides with a liquid medium adapted to absorb the one or more chlorides. In the FIGURE such a chamber has been denoted as a whole by 30. In the particular case shown, the introduction of the gaseous mixture to the inside of the chamber is done through a pipe 31 which opens as shown in the midst of the liquid 32 into which the mixture containing the chlorides bubbles. The chamber 30 comprises also means (not shown) enabling the extraction therefrom of the unabsorbed gases (through a pipe 33) and the liquid which has absorbed the chlorides (through a pipe 34). The replenishment of absorbing liquid can be effected through a pipe 35.

The given installation can comprise one or several recovery chambers; when it comprises at least two chambers, the latter can be constructed individually either according to the same embodiment, or according to different embodiments.

In the FIGURE, there is shown an assembly comprising in addition to the chlorinating tank 1, three recovery chambers 10, 20 and 30 constructed respectively according to each of the embodiments which have just been described. In this FIGURE there is shown diagrammatically the connection in series of the tank 1 and of the chambers 10, 20 and 30 (pipes $C_1$, $C_2$ and $C_3$). Such an assembly enables the isolation of at least two of the chlorides of a mixture obtained by treatment, according to the method of the invention, from an alloy containing at least three metals.

At the level of the extraction pipe for the gases emerging from the last recovery chamber — in the case of the FIGURE it relates to the pipe 33 from the chamber 30 — there may be provided a pressure reducing device, for example a fan 40.

To illustrate the foregoing, there will now be given several examples of the application of the method according to the invention.

EXAMPLE 1

There are introduced into a chlorinating tank a charge containing 100 kg of stainless steel scrap and of nickel and copper mats, in pieces of sizes less than 50 mm, as well as 80 kg of coke in pieces of sizes also less than 50 mm.

The composition of the metallic portion of the charge is about:

| | |
|---|---|
| Fe: | 25% |
| Ni: | 38% |
| Cu: | 20% |
| S : | 17% | whilst the coke used has a carbon content of 87 percent.

The temperature in the chlorinating tank is kept at about 1100°C.

The chlorinating tank is supplied in addition with chlorinating gases whose composition, expressed by volume, is as follows:

| | |
|---|---|
| $Cl_2$: | % |
| HCl: | 10% |
| $O_2$ : | 5% |
| $CO_2$: | 40% |
| $N_2$ : | 5% |

The gaseous mixture which emerges from the chlorinating tank and which contains the chlorides formed, is introduced into a first recovery chamber, inside of which the solidification of the $Cu_2Cl_2$ is caused by placing the gaseous phase in contact with the mixture of cold nickel and copper chlorides ($NiCl_2$, $Cu_2Cl_2$), in the form of powder; the $Cu_2Cl_2$ thus obtained has a purity greater than 95 percent.

The gaseous mixture emerging from this first recovery chamber and which is freed of the $Cu_2Cl_2$ that it contained, is introduced into a second recovery chamber, inside of which the $NiCl_2$ is recovered by solidification in contact with a wall cooled by air. In this chamber there is provided a scraper device which removes the chloride formed whilst allowing only a layer of 5mm to remain. The nickel chloride thus recovered has a purity greater than 98 percent.

After elimination of the nickel chloride, the gases emerging from the second recovery chamber are introduced into a third recovery chamber inside of which they are washed by means of a dilute solution of $FeCl_3$ in water, sprayed into this third recovery chamber; the ferric chloride which was contained in the gaseous mixture is thus retained in this third chamber in the form of a solution which reaches a content of $FeCl_3$ of 40 percent in the water at the end of the operation. The residual gases are extracted from the third enclosure by means of a fan creating a lowered pressure of 100 mm of water.

EXAMPLE 2

Into a chlorinating tank operating at a temperature of 1100°C, there are introduced on one hand, a metallic charge containing 100 kg of 60 percent ferrochrome scrap in the form of pieces having a size of 50 mm at the most and of which the composition is approximately as follows:

| | |
|---|---|
| Cr: | 60% |
| Fe: | 30% |
| C : | 8% |
| S : | 1% |
| Mn: | 1%, | on the other hand, a chlorinating gas which is at ambient temperature and whose composition is approximately the following:

| | |
|---|---|
| $Cl_2$: | 10% |
| HCl: | 60% |
| $O_2$ : | 20% |
| $N_2$ : | 10% |

The gaseous mixture emerging from the chlorinating tank at a temperature of 1100°C and which comprises the following chlorides: $FeCl_2$, $FeCl_3$ and $CrCl_2$, is introduced into a recovery chamber inside of which there is withdrawn by mixing with large amounts of sprayed $CCl_4$ — technique called scrubbing — the abovesaid chlorides.

The chlorides thus recovered in the carbon tetrachloride are separated from the latter by any known technique, for example by distillation; in the case where it is desired to separate the chromium chloride from the iron chloride, the mixture may be subjected to distillation at a temperature of 450°C in the presence of gaseous chlorine which results a gaseous phase of $FeCl_3$ and which allows a crystalline phase to remain at a content greater than 95% of $CrCl_3$.

EXAMPLE 3

Into a chlorinating tank, there are introduced a charge containing 100 kg of 25% ferronickel scrap having the form of pieces of size less than 60 mm as well as 60 kg of coke in the form of pieces of size comprised between 40 and 60 mm.

The composition of the metallic portion of the charge is approximately as follows:

| | |
|---|---|
| Ni: | 25% |
| As: | 0.3% |
| S : | 0.1% |
| Fe: | q.s.p. 100%, | whilst the coke used has a carbon content of 84 percent.

There is introduced also into said tank, a chlorinating gas at the ambient temperature and containing approximately 50% of $Cl_2$, 30% of HCl, 10% of $O_2$ and 10% of $CO_2$.

The operating temperature of the chlorinating tank is about 1050°C.

The gaseous mixture, which emerges from the chlorinating tank and of which the temperature is 1050°C, is introduced into a first recovery chamber, inside of which it is cooled by mixture with a controlled amount of cold ferric chloride in the form of powder, the said amount being such that the temperature of the mixture is lowered to 700°C, which causes the solidification of the nickel chloride. This nickel chloride has a degree of purity greater than 98 percent.

The recovery of the ferric chloride which is to be found in the gases emerging from this first enclosure may be effected in the manner described in Example 1.

EXAMPLE 4

Into a chlorinating tank, there is introduced a charge of 100 kg of scrap and of mat; this charge, which is in the form of pieces of size of about 15 mm corresponds to the following approximate composition:

| | |
|---|---|
| Cu: | 52% |
| S : | 23% |
| Fe: | 20% |
| As: | 2% |
| Ag: | 0.1% |
| Impurities: | q.s.p. 100% |

The operating temperature of the chlorinating tank is 900°C.

There is also introduced into this tank a mixture of chlorinating gases of the following composition:

| | |
|---|---|
| $Cl_2$: | 60% |
| HCl: | 10% |
| $O_2$: | 25% |
| $N_2$: | 5% |

The gaseous mixture emerging from the tank at the temperature of 900°C and which contains the chlorides formed, is introduced into a first recovery chamber inside of which solidification of the $Cu_2Cl_2$ is caused by placing in contact the gaseous mixture with a wall cooled to 400°C by means of air; in this enclosure there is provided a scraping device which removes the $CuCl_2$ formed leaving a layer of only 10 mm to remain. The copper chlorides thus prepared has a degree of purity greater than 95 percent. If desired, the iron chloride in the gases emerging from the enclosure can be recovered, by proceeding in the manner described in Example 1.

As is self-evident and as emerges already from the foregoing, the invention is in no way limited to those of its types of application and embodiment which are especially envisaged; it encompasses, on the contrary, all modifications.

I claim:

1. In a method for the manufacture of metallic chlorides comprising:
    providing a raw material containing as an alloy at least two metals selected from the group consisting of iron, nickel, chromium, copper and cobalt,
    said raw material optionally containing sulfur, the amount of said metals, together with any sulfur present in said raw material, being more than 80% by weight of the raw material, said raw material being in the form of ingots, scrap metal, or mats, in pieces less than 200 mm in size,
    providing a chlorinating zone containing a gaseous chlorinating mixture containing chlorine, HCl, and oxygen, the partial pressures of these constituents being as follows:
    $2P_{Cl_2} + P_{HCl} > 0.2$ atmosphere, and
    $P_{O_2} < P_{HCl} + P_{Cl_2}$,
    introducing said raw material into said chlorinating zone,
    introducing a temperature regulating material into said reaction zone to regulate temperature in said zone,
    maintaining the temperature in said chlorinating zone at a temperature of from 600°C to 1350°C, and maintaining said partial pressures of said chlorinating constituents, to chlorinate at least two said metals to form at least two gaseous metal chlorides,
    introducing the gaseous metal chlorides to a cooling vessel having a layer of solid metal chloride on a wall thereof and cooling said wall to reduce the vapor pressure of said vapor to condense and recover at least one metal chloride on said layer of solid metal chloride, and
    recovering the condensed metal chloride,
    the improvement which comprises
    maintaining, in the chlorination zone, the amount of chlorine at more than 5 volume % and less than 90 volume %, the amount of HCl at more than 1 volume % and less than 75 volume %, and the amount of oxygen at more than 1 volume % and less than 35 volume %.

2. An improved method according to claim 1 wherein the thickness of said layer of solid metal chloride is between 2 and 15 mm.

3. An improved method according to claim 1 wherein said wall is cooled.

4. In a method for the manufacture of metallic chlorides comprising:
    providing a raw material containing as an alloy at least two metals selected from the group consisting of iron, nickel, chromium, copper and cobalt,
    said raw material optionally containing sulfur, the amount of said metals, together with any sulfur present in said raw material, being more than 80 percent by weight of the raw material, said raw material being in the form of ingots, scrap metal, or mats, in pieces less than 200 mm in size,
    providing a chlorinating zone containing a gaseous chlorinating mixture containing chlorine, HCl, and oxygen, the partial pressures of these constituents being as follows:
    $2P_{Cl_2} + P_{HCl} > 0.2$ atmosphere, and
    $P_{O_2} < P_{HCl} + P_{Cl_2}$,
    introducing said raw material into said chlorinating zone,
    maintaining the temperature in said chlorinating zone at a temperature of from 600°C to 1350°C, and maintaining said partial pressures of said chlorinating constituents, to chlorinate at least two said metals to form at least two gaseous metal chlorides,
    reducing the vapor pressure of said gaseous metal chlorides sufficiently to recover at least one of said metal chlorides as a liquid or solid metal chloride, and
    recovering the condensed metal chloride,
    the improvement which comprises
    maintaining, in the chlorination zone, the amount of chlorine at more than 5 volume % and less than 90 volume %, the amount of HCl at more than 1 volume % and less than 75 volume %, and the amount of oxygen at more than 1 volume % and less than 35 volume %.

5. An improved method according to claim 4 in which said vapor pressure is reduced by cooling said gaseous metal chlorides.

6. An improved method according to claim 4 wherein at least one metal chloride is recovered by introducing the gaseous metal chlorides to a cooling vessel having a layer of solid metal chloride on a wall thereof and cooling said wall to reduce the vapor pressure of said vapor to condense at least one metal chloride on said layer of solid metal chloride.

7. An improved method according to claim 4 wherein said raw material is preheated to a temperature of at least 500°C prior to being introduced into said chlorination zone.

8. An improved method according to claim 4 wherein the vapor pressure of said gaseous metal chlorides is reduced by contacting said vapor with a liquid capable of absorption of said metal chloride vapor.

9. An improved method according to claim 4 wherein recovery of said at least one metal chloride is effected in an enclosure in which pressure is maintained below atmospheric.

10. An improved method according to claim 4 wherein said chlorine and HCl are mixed prior to being introduced into said chlorination zone.

11. An improved method according to claim 1 wherein said temperature regulating material comprises a gas selected from the group consisting of $CO_2$ and $N_2$.

12. An improved method according to claim 1 wherein said temperature regulating material comprises a solid carbon-containing material.

13. An improved method according to claim 8 wherein said liquid is water, $CCl_4$, or $C_2Cl_6$.

* * * * *